United States Patent [19]

Durigon

[11] Patent Number: 4,884,654
[45] Date of Patent: Dec. 5, 1989

[54] TRANSMISSION CONTROL LOCKING DEVICE

[76] Inventor: Duilio Durigon, 61 Homestead Road, Rau Marais Park, Rau Marais Park Sandton, 2090, Transvaal, South Africa

[21] Appl. No.: 88,132

[22] Filed: Aug. 21, 1987

[30] Foreign Application Priority Data

Aug. 22, 1986 [ZA] South Africa ........................ 86/6372

[51] Int. Cl.[4] ............................................. B60R 25/00
[52] U.S. Cl. .................................... 180/287; 70/247; 292/144
[58] Field of Search .................. 180/287; 70/245, 247; 292/144

[56] References Cited

U.S. PATENT DOCUMENTS

| | | | |
|---|---|---|---|
| 1,743,730 | 1/1930 | Rugg et al. ........................... | 70/247 |
| 1,792,990 | 2/1931 | La Vron Way ..................... | 180/287 |
| 1,972,300 | 9/1934 | Hemingway, Jr. .................. | 180/287 |
| 3,994,183 | 11/1976 | Markl ................................. | 180/287 |
| 4,326,432 | 4/1982 | Miller ................................. | 180/287 |

*Primary Examiner*—Kenneth R. Rice
*Attorney, Agent, or Firm*—Ladas & Parry

[57] ABSTRACT

This invention relates to a motor vehicle immobilizing device which is adapted to disable the drive train of the motor vehicle under the control of known remotely controllable locking means adapted releasably to lock an actuator member constituted by a transmission gear selector lever (74) in a predetermined position when the lever is moved to that position. the predetermined position of the lever (74) coincides with the position of a gear selection which disables the vehicle drive train. This could be achieved by disengaging the gear box, that is by selecting the "neutral" position of the transmission or, in automatic gear boxes, by selecting the "park" position of the transmission, or in all types of gearboxes, by selecting the "reverse" position of the transmission. The object in each case is essentially to make it difficult, if not impossible, to drive the vehicle away in any normal manner. The immobilizing device may be adapted releasably to lock the clutch actuation lever (10) the locking means being adapted to lock the lever (10) in a disengaged position of the clutch by means of a spring-loaded solenoid catch adapted to engage the lever when the lever is operated while the solenoid is de-energized. Energization of the solenoid allows disengagement of the clutch and permits normal opertion thereof.

8 Claims, 2 Drawing Sheets

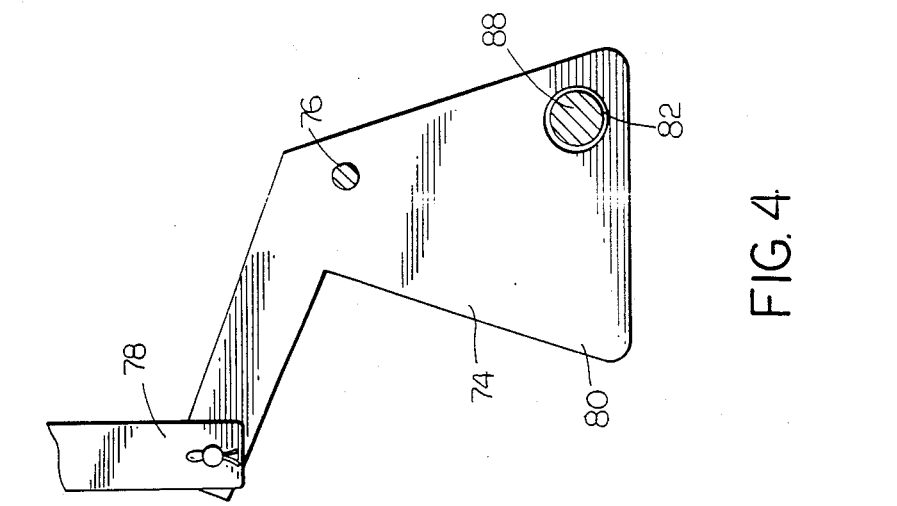
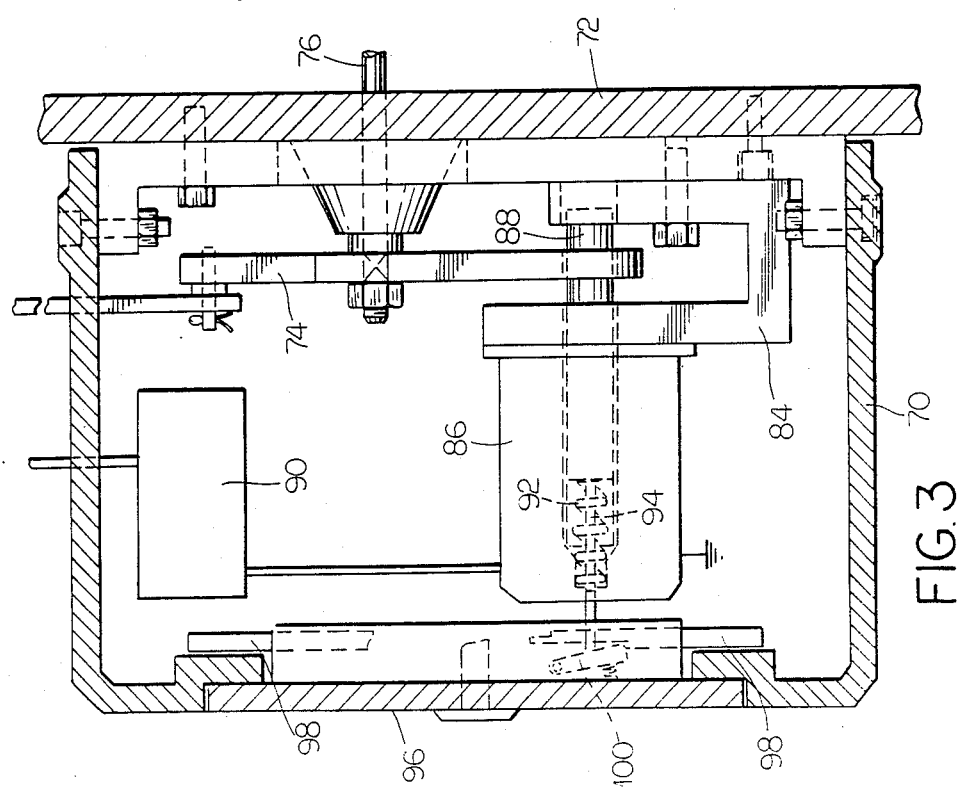

TRANSMISSION CONTROL LOCKING DEVICE

BACKGROUND OF THE INVENTION

This invention relates to a motor vehicle immobilising device which is adapted to disengage the motor vehicle engine from the drive train thereof either by disengagement of the clutch or by disengagement or locking of the gear box.

Simple locking devices for vehicle transmissions have been proposed. One such device comprises a plate which fits over the gear lever of a motor vehicle and which is locked in position, thereby preventing operation of the gear lever. In addition pedal locks have been proposed by means of which, for instance, the clutch pedal of the motor vehicle could be locked relatively to the vehicle body, thereby preventing depression of the clutch pedal.

A more sophisticated clutch lock is described in French patent No. 2,572,037—BARBAROT. This patent describes an anti-theft device which incorporates an encoder arrangement linked to an electromagnetically operable catch which, in turn, engages a multiple rocker arm capable of locking the clutch lever against movement indirectly by engagement of the clutch cable.

French patent No. 996,062—GUILLOU ET AL, U.S. Pat. No. 2,992,693—PEYTON and U.S. Pat. No. 3,610,004—GENERAL MOTORS CORPORATION, all describe drive shaft locking means.

U.S. Pat. No. 3,718,202—TEXAS INSTRUMENTS INC. describes a transmission locking system in which an encoding and decoding device is used to energise or de-energise a drive train locking mechanism. The locking mechanism of this patent is constituted by a gear dog which may be interposed between the gears in the transmission locking system of the motor vehicle, to lock the gears to one another when the vehicle transmission is in the "park" position.

SUMMARY OF THE INVENTION

According to the invention a motor vehicle immobilising device is adapted to disable the drive train of the motor vehicle and comprises remotely controllable locking means adapted releasably to lock an actuator member constituted by a transmission gear selector lever in a predetermined position when the lever is moved to that position, the predetermined position of the lever coinciding with the position of a gear selection which disables the vehicle drive train.

The vehicle drive train may be disabled either by disengaging the gear box, that is by selecting the "neutral" position of the transmission or, in automatic gear boxes, by selecting the "park" position of the transmission, or in all types of gearboxes, by selecting the "reverse" position of the transmission. The object in each case is essentially to make is difficult, if not impossible, to drive the vehicle away in any normal manner.

Further according to the invention, the immobilising device may comprise remotely controllable locking means adapted releasably to lock an actuating member constituted by a clutch actuation lever, the locking means being adapted to lock the lever in a disengaged position of the clutch by means of a spring-loaded solenoid-operated catch adapted to engage the lever when the lever is operated while the solenoid is de-energised, energisation of the solenoid allowing disengagement of the clutch and permitting normal operation thereof.

BRIEF DESCRIPTION OF THE DRAWINGS

In the drawings:

FIG. 3 is a part-sectional view of an automotic transmission locking device according to the invention; and FIG. 4 is a side view of the locking mechanism of the transmission locking device of FIG. 3.

DESCRIPTION OF PREFERRED EMBODIMENTS

The immobilising device of the invention finds particular application as an anti-theft device and, to this end, is provided with any one of a number of known encoding and decoding devices by means of which the locking means may be activated and deactivated. The locking means serves, essentially, to disable the drive train of the vehicle by locking a transmission actuator in a position such that the drive train is disabled. This may be done either by locking the gear selector lever of the vehicle in "neutral", in "park" or in "reverse", or by locking the clutch lever in a disengaged position.

This arrangement differs from the arrangements discussed above with reference to the prior art in that the clutch locking mechanism of French patent No. 2,572,037—BARBAROT engages a push rod or clutch cable extending between the clutch pedal and the clutch actuation lever. Of course, in an anti-theft device, this leaves open the possibility of the disconnection of the clutch actuating lever from the locked cable or push rod and the operation of the vehicle without the use of the clutch. This would, of course, allow the anti-theft device to be defeated.

The drive shaft locking mechanisms described in U.S. Pat. Nos. 3,610,004—GENERAL MOTORS CORP. and 2,992,632—PEYTON and in French patent No. 996,062 GUILLOU ET AL are, in effect, park mechanisms which, in view of the leverage involved, could be easily destroyed by a person wishing to defeat the drive shaft lock.

The locking mechanism described in U.S. Pat. No. 3,718,202—TEXAS INSTRUMENTS INC., locks the gears of the vehicle transmission to one another rather than locking the gear selector mechanism. The result is a relatively expensive and intrusive device which would have to be built into the gear box as opposed to the device of the invention which can be attached to the side of the gear box, if desired.

Figure 1:
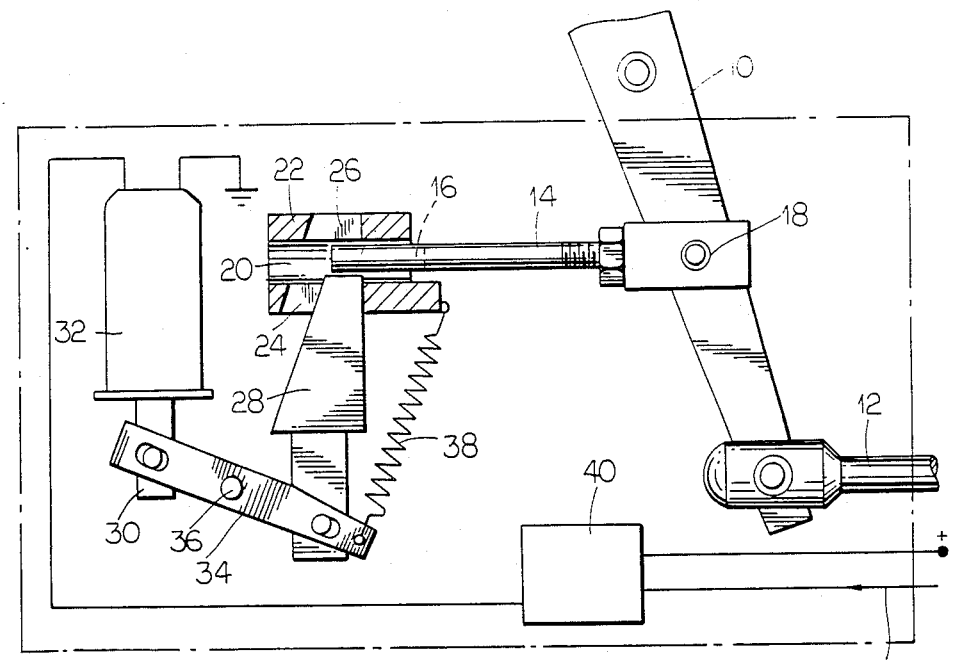
FIGS. 1 and 2 are diagrammatic view of a mechanical clutch locking device according to the invention—in locked and unlocked positions respectively.
Figure 2:
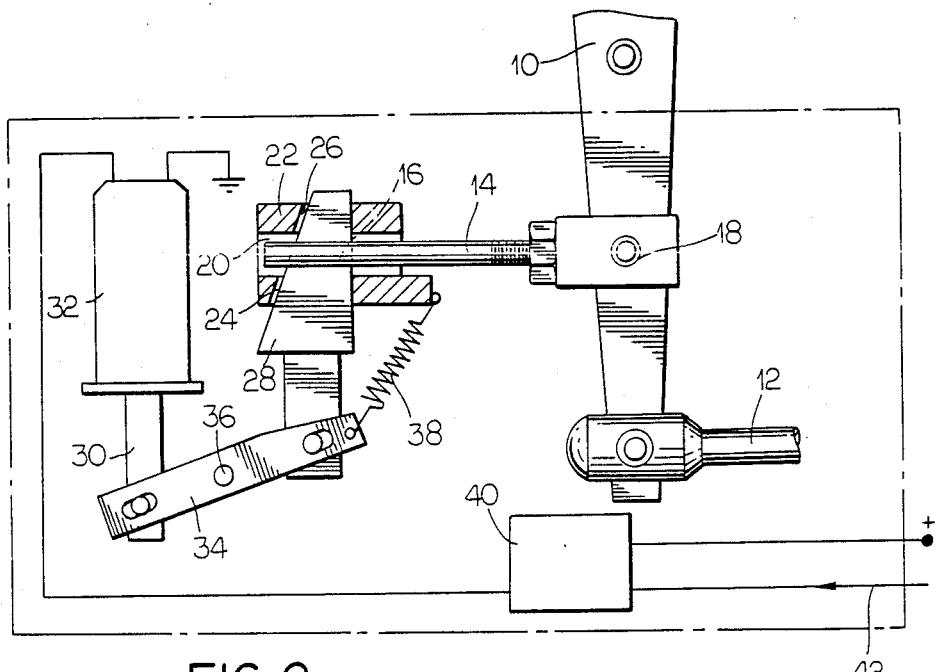

Referring to FIGS. 1 and 2, a mechanically operated clutch has a clutch operating lever 10, which is operated by a push rod 12 directly to actuate the clutch. A locking rod 14 with a slot 16 formed therein, is mounted pivotably at 18 on the operating lever 10. The rod 14 is free to slide in a bore 20 formed in a locking frame 22 (shown in section) and the locking frame 22 is provided with slots 24 and 26 to receive a tapered locking plate 28 which is mounted for movement at right angles to the direction of movement of the slotted rod 14.

The locking plate 28 is arranged for operation by the plunger 30 of a solenoid 32 via an arm 34 which is pivoted at 36. A coil spring 38 is connected between the end of the arm 34, to which the locking plate 28 is connected, and the locking frame 20, and urges the locking plate 28 towards the locking frame 20. The solenoid 32 is controlled by an electronic circuit 40 which switches power to the solenoid according to the state of a control signal on an input 42.

In FIG. 1, the clutch is shown engaged, and the solenoid 32 is energised. The locking plate 28 is pulled out of the locking frame 20 against the force of the spring 38, and the locking rod 14 is free to move in and out of the bore 20, allowing normal operation of the clutch.

When the solenoid 32 is de-energised, the spring 38 pulls the locking plate 28 against the slotted rod 14. As soon as the operating lever 10 is moved into the position shown in FIG. 2, that is as soon as the clutch pedal is depressed and the clutch is disengaged, the rod 14 will move into the locking frame 22. When the slot 16 in the rod 14 is in alignment with the slots 24, 26 in the frame 22, the locking plate 28 will move under the urging of the spring 38 into the position shown in FIG. 2 with the plate engaged in the slot 16 in the rod 14, locking the clutch in the disengaged position, the car is thus immobilised, and can only be driven when the solenoid 32 is energised once more.

The electronic circuit 40 is preferably controlled by a code which is entered on a key pad in the vehicle, or can be actuated by means of a transmitter from inside or outside the car. The entire locking device is preferably located in a sturdy metal housing which is attached firmly to the vehicle clutch housing.

Instead of a solenoid, actuating devices such as a hydraulic servo unit activated by the engine oil pressure, or a vacuum servo unit activated by the inlet manifold vacuum of the vehicle engine could be used.

The wedge shape of the locking plate 28 allows the locking device to compensate for the gradual shift in the position of the operating lever 10 due to wear of the clutch lining.

FIGS. 3 and 4 illustrate a locking device for an automatic transmission. The locking device is encased in a sturdy housing 70 which is bolted onto the transmission casing 72. The transmission is operated by a gear selector lever 74 which is fixed to a shaft 76 and which is operated by a selector rod 78. The selector lever 74 has an enlarged heel 80 in which is formed an aperture 82. A bracket 84 inside the housing 70 carries a solenoid 86 with a spring loaded plunger 88 which fits into the aperture 82.

As in the previously described system, the solenoid 86 is operated by a remotely controlled electronic circuit 90. When the solenoid 86 is energised, the plunger 88 is retracted against the urging of a spring 92 and the selector lever 74 is free to operate normally. When the solenoid is de-energised, the plunger 88 bears against the enlarged heel 80 of the operating lever 74 under the force of the spring 92 and as foon as the lever 74 is moved to the "park" position, the plunger 88 enters the aperture 82, preventing further movement of the lever 74. The aperture 82 can be positioned to lock the selector lever 74 in some other position, such as the "neutral" position, for instance, or the "reverse" position, the intention in each case being to lock the transmission in a position in which the vehicle is either actually immobilised or difficult to drive in any normall manner.

The solenoid 88 has an extension 94 which protrudes beyond the end of the solenoid remote from the bracket 94 when the solenoid is energised. A lockable access plate 96 is fitted to the housing 70 and is locked in position by means of a key operated mechanism having two fingers 98. A spring loaded pawl 100 locks one of the fingers 98 in position when the solenoid is de-energised.

When the solenoid is energised, the extension 94 presses against the pawl 100, allowing the the fingers 98 to be moved if desired. This mechanism prevents removal of the access cover 96 by unauthorised persons, even if they have a key, while the solenoid 86 is de-energised. This access system can, of course, be applied to the locking devices described above.

The transmission locking device of the invention can be built into the vehicle gearbox or automatic transmission at the factory, reducing the cost of the device and making it more difficult to detect.

I claim:

1. A motor vehicle immobilizing device which is adapted to disable the drive train of the motor vehicle and which comprises remotely controllable locking means adapted releasably to lock an actuator member constituted by a transmission gear selector lever in a predetermined position when the lever is moved to that position, the predetermined position of the lever coinciding with the position of a gear selection which disables the vehicle drive train by the disengagement of the transmission therefrom, the predetermined position of the selector lever coinciding with the "neutral" position of the transmission, the immobilizing device being adapted to disable the drive train of the vehicle by the provision of a gear selector lever with an enlarged heel in which is formed an aperture, the locking means including a solenoid with a spring loaded plunger which fits into the aperture in the enlarged heel, the solenoid being energisable by a remotely controlled electronic circuit which is adapted to retract the plunger against the urging of a spring to free the selector lever for normal operation and the plunger, with the solenoid de-energized, being adapted to bear against the enlarged heel of the operating lever under the force of the spring and to enter the aperture in the heel in the predetermined position of the lever, to prevent further movement of the lever.

2. A motor vehicle immobilizing device according to claim 1 which is housed within a housing adapted for securement to the vehicle transmission system housing, the solenoid having an extension which protrudes beyond the end of the solenoid remote from the plunger when the solenoid is energized, the device housing including a lockable access plate which is lockable in position by means of a key operated mechanism having a plurality of retractable fingers, a spring loaded pawl being provided to lock at least one of the fingers in a locking position when the solenoid is de-energized and the extension on the solenoid being adapted, upon energisation of the solenoid, to engage and move the pawl to release the locked finger to allow the retraction of the fingers.

3. A motor vehicle immobilizing device which is adapted to disable the drive train of the motor vehicle and which comprises remotely controllable locking means adapted releasably to lock an actuator member constituted by a transmission gear selector lever in a predetermined position when the lever is moved to that position, the predetermined position of the lever coinciding with the position of a gear selection which disables the vehicle drive train by the engagement of the transmission thereto, the predetermined position of the selector lever coinciding with the "reverse" position of the transmission, the immobilizing device being adapted to disable the drive train of the vehicle by the provision of a gear selector lever with an enlarged heel in which is formed an aperture, the locking means including a solenoid with a spring loaded plunger which fits into the aperture in the enlarged heel, the solenoid being energisable by a remotely controlled electronic circuit which is adapted to retract the plunger against the urging of a spring to free the selector lever for normal operation and the plunger, with the solenoid de-energised, being adapted to bear against the enlarged heel of the operating lever under the force of the spring and to enter the aperture in the heel in the predetermined position of the lever, to prevent further movement of the lever.

4. For a motor vehicle with an automatic transmission, a motor vehicle immobilizing device which is adapted to disable the drive train of the motor vehicle and which comprises remotely controllable locking means adapted releasably to lock an actuator member constituted by a transmission gear selector lever in a predetermined position when the lever is moved to that position, the predetermined position of the lever coinciding with the position of a gear selection which disables the vehicle drive train by the engagement of the transmission thereto, the predetermined position of the selector lever coinciding with the "park" position of the transmission, the immobilizing device being adapted to disable the drive train of the vehicle by the provision of a gear selector lever with an enlarged heel in which is formed an aperture, the locking means including a solenoid with a spring loaded plunger which fits into the aperture in the enlarged heel, the solenoid being energisable by a remotely controlled electronic circuit which is adapted to retract the plunger against the urging of a spring to free the selector lever for normal operation and the plunger, with the solenoid de-energized, being adapted to bear against the enlarged heel of the operating lever under the force of the spring and to enter the aperture in the heel in the predetermined position of the lever, to prevent further movement of the lever.

5. A motor vehicle immobilizing device for a motor vehicle including a clutch mechanism, the immobilizing device being adapted to disable the drive train of the motor vehicle and comprising remotely controllable locking means adapted releasably to lock a direct actuation lever of the clutch in a disengaged position of the clutch by means of a spring loaded solenoid operated catch adapted to engage the lever when the lever is operated and the solenoid is de-energized, energisation of the solenoid allowing disengagement of the clutch and permitting normal operation thereof, the clutch operating lever being constituted by a push rod and the spring loaded catch being constituted by a locking rod with a slot formed therein and which is mounted pivotably on the operating lever, and a locking frame, the locking rod being free to slide in a bore formed in the locking frame and slots being formed in the locking frame to receive a tapered locking plate which is mounted for movement at right angles to the direction of movement of the locking rod, the locking plate being arranged for operation by the plunger of the solenoid and a coil spring being connected to urge the locking plate toward the locking frame, the locking plate, when withdrawn from the locking frame against the force of the spring, allowing the locking rod to move in and out of the bore and allowing normal operation of the clutch and the solenoid when de-energized, allowing the spring to urge the locking plate to bear against the locking rod for the locking plate to move, under the urging of the spring, into the slot in the locking rod to lock the clutch in the disengaged position, when the clutch actuating lever is moved into the predetermined position.

6. A motor vehicle immobilizing device which is adapted to disable the drive train of the motor vehicle and which comprises remotely controllable locking means adapted releasably to lock an actuator member constituted by the initial transmission selector link emerging from the vehicle transmission housing and connectable to a hand operated gear selector lever, in a direct manner and at a location external to the transmission system housing, in a predetermined position when the link is moved to that position, the predetermined position of the link coinciding with the position of a gear selection which disables the vehicle drive train by the disengagement of the transmission therefrom and, the predetermined position of the selector link coinciding with the "neutral" position of the transmission.

7. A motor vehicle immobilizing device which is adapted to disable the drive train of the motor vehicle and which comprises remotely controllable locking means adapted releasably to lock an actuator member constituted by the initial transmission selector link emerging from the vehicle transmission housing and connectable to a hand operated gear selector lever, in a direct manner and at a location external to the transmission system housing, in a predetermined position when the link is moved to that position, the predetermined position of the link coinciding with the position of a gear selection which disables the vehicle drive train by the engagement of the transmission thereto and the predetermined position of the link coinciding with the "reverse" position of the transmission.

8. For a motor vehicle with an automatic transmission a motor vehicle immobilizing device which is adapted to disable the drive train of the motor vehicle and which comprises remotely controllable locking means adapted releasably to lock an actuator member constituted by the initial transmission selector link emerging from the vehicle transmission housing and connectable to a hand operated gear selector lever, in a direct manner and at a location external to the transmission system housing, in a predetermined position when the link is moved to that position, the predetermined position of the link coinciding with the position of a gear selection which disables the vehicle drive train by the engagement of the transmission thereto and the predetermined position of the link coinciding with the "park" position of the transmission.

* * * * *